United States Patent
Barber et al.

(12) 
(10) Patent No.: US 6,632,133 B2
(45) Date of Patent: Oct. 14, 2003

(54) AIR FILTER FOR VEHICLE VENTILATION

(75) Inventors: Jaime Barber, Gorseinon Swansea (GB); Kevin Jones, Gorseinon Swansea (GB)

(73) Assignee: Valeo Climate Control Limited, Swansea (GB)

( * ) Notice: Subject to any disclaimer, the term of this patent is extended or adjusted under 35 U.S.C. 154(b) by 0 days.

(21) Appl. No.: 09/893,526

(22) Filed: Jun. 29, 2001

(65) Prior Publication Data
US 2002/0090907 A1 Jul. 11, 2002

(30) Foreign Application Priority Data
Jun. 29, 2000 (GB) ................................. 0016004

(51) Int. Cl.[7] ................................................ B60H 3/06
(52) U.S. Cl. ...................................... 454/158; 55/309.1
(58) Field of Search ............................... 454/147, 148, 454/158; 55/309, 309.1

(56) References Cited

U.S. PATENT DOCUMENTS

| 3,651,659 | A | * | 3/1972 | Nakao et al. | ................ 454/156 |
| 5,050,487 | A | * | 9/1991 | Arold et al. | ................ 165/119 |
| 5,076,821 | A | * | 12/1991 | Bruhnke et al. | ............ 454/158 |
| 5,501,716 | A | * | 3/1996 | Chiba et al. | ................ 55/309.1 |
| 5,860,856 | A | * | 1/1999 | Teich et al. | ................ 454/137 |
| 6,129,140 | A | | 10/2000 | Kawahara | |

FOREIGN PATENT DOCUMENTS

| EP | 0634299 | | 1/1995 |
| JP | 10-16532 | | 1/1998 |
| JP | 10-181341 | * | 7/1998 |

* cited by examiner

Primary Examiner—Harold Joyce
(74) Attorney, Agent, or Firm—Liniak, Berenato & White

(57) ABSTRACT

An air filter assembly for a motor vehicle has a filter housing and an air filter disposed in the housing. The housing has a liquid outlet downstream of the filter and a filter bypass passageway is provided for enabling liquid entering at an air inlet to flow past the filter and exit through the outlet.

14 Claims, 2 Drawing Sheets

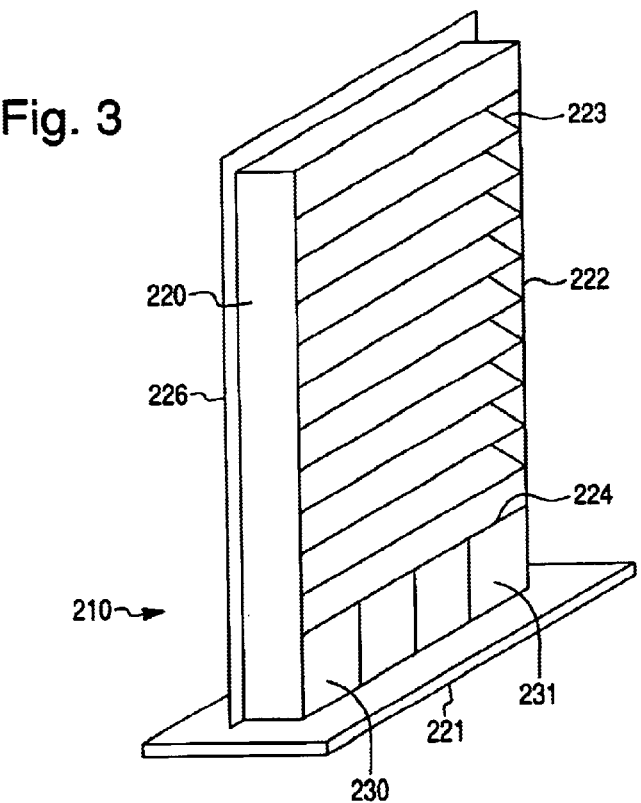
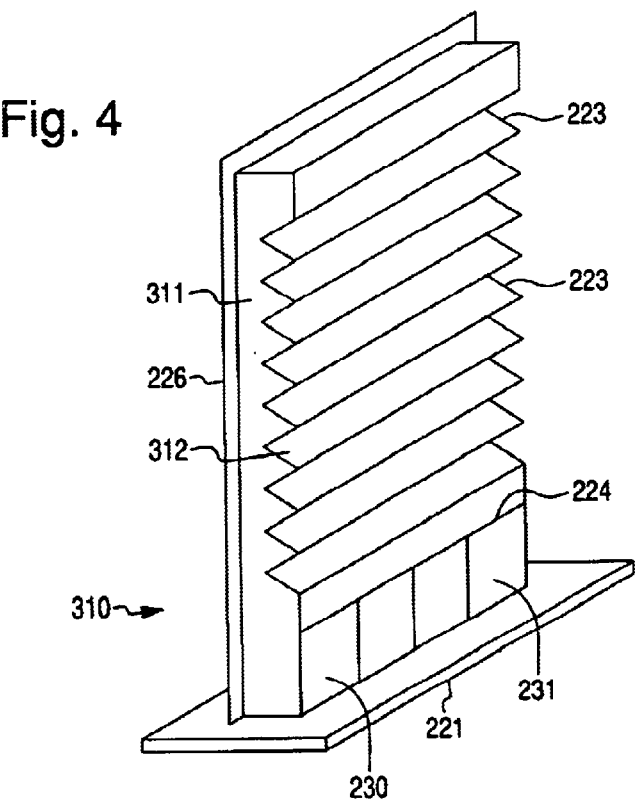

AIR FILTER FOR VEHICLE VENTILATION

BACKGROUND OF THE INVENTION

1. Field of the Invention

The present invention relates to air filter for a vehicle ventilating or air conditioning unit.

2. Description of the Related Art

It is now common to provide passenger vehicles such as cars with air conditioning units. Such units typically comprise a housing having a first inlet in use disposed in communication with the interior of the vehicle passenger compartment and a second air inlet for inducing ambient air. The housing contains an evaporator whose function is to cool the air which enters via one or other of the inlets, and the housing has an air outlet for cooled air. As is known to those skilled in the art, the cooled air is usually passed to a heating and distribution unit for supply to different openings within the passenger compartment.

When air of high humidity is passed through the cooling evaporator, the moisture in the air condenses out and it is therefore necessary to provide a liquid outlet downstream of the evaporator, and normally near to or in the bottom wall of the housing so that the condensate can be suitably disposed of.

Air conditioning units are of particular utility in high temperature high humidity parts of the world, for example tropical parts of the world. A difficulty may arise when high rainfall leads to water being induced through the external air inlet. Unless a technique is devised for guiding water induced in this way out of the air conditioning unit, the water will collect in the housing and stagnate thereby giving rise to smells, will prevent the filter member from working properly or may eventually leak into the passenger compartment.

It is accordingly an object of the present invention to provide an air conditioning unit which is capable of coping with incoming rain.

SUMMARY OF THE INVENTION

According to a first aspect of the present invention there is provided an air filter assembly for a motor vehicle comprising filter housing and an air filter, the filter housing having an air inlet and an air outlet, the air filter being disposed in said filter housing, and the housing having at least one liquid outlet downstream of the filter wherein the assembly has a filter bypass passageway for enabling liquid entering at said air inlet to flow past said filter to said liquid outlet.

Preferably, the filter housing further comprises an evaporator disposed downstream of the filter.

Preferably the housing has a lower wall and the air filter has a lower portion spaced from the lower wall to define said passageway therebetween.

Advantageously the air filter has a total area more than 10 times the area of said passage.

Conveniently the filter assembly has an upper wall, opposing sidewalls and a lower wall, said lower wall defining an opening therein, a filter module having a portion extending through said opening, the filter module further having a face plate sealingly abutting an outer face of said lower wall, said filter module comprising a frame having an outer perimeter portion engaging the sidewalls and said upper wall, said frame supporting a filter member spaced from said lower wall to define said passage.

Advantageously said frame comprises a transverse web spaced from the face plate and defining therebetween a through hole.

Conveniently the air conditioning unit further comprises plural supporting web portions disposed between the face plate and said transverse web.

Preferably the filter member has a total area more than 30 times the area of said passage.

Preferably the outer perimeter portion has an outwardly-directed flange portion and the housing has a counterpart slot. Preferably the lower wall has a depressed region forming a trough.

Conveniently said trough is substantially filled with a closed foam material.

Advantageously said closed foam material comprises liquid guide passageways for directing the liquid to said liquid outlet.

An embodiment of the invention will now be described by way of example only, with respect to the accompanying drawings in which:

BRIEF DESCRIPTION OF THE DRAWINGS

FIG. 3 shows a perspective view of a first filter module for use with the embodiment of FIG. 2 and;

FIG. 4 shows a perspective view of a second embodiment of a filter module for use with the embodiment of FIG. 2.

DETAILED DESCRIPTION OF THE PREFERRED EMBODIMENTS

Figure 1:
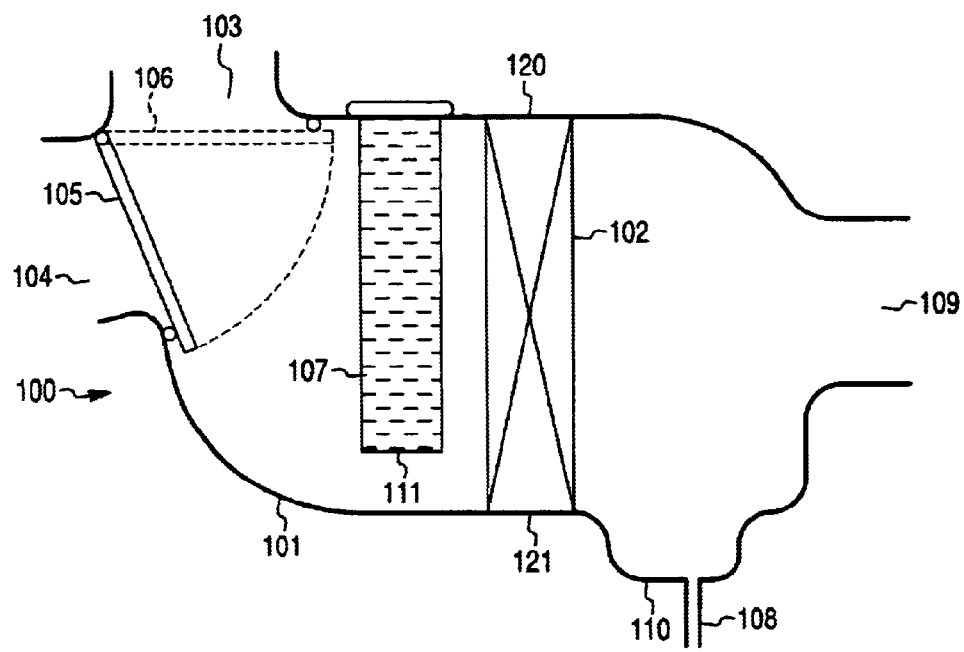
FIG. 1 shows a sectional view through a first embodiment of an air filter assembly in accordance with the invention.

In the various figures like reference numerals refer to like parts.

Referring first to FIG. 1, the first embodiment 100 of an air filter assembly consists of a casing 101 hereinafter referred to as "a filter housing" and an evaporator 102 disposed to engage upper 120 and lower 121 walls of the evaporator housing 101. It will be understood that the evaporator 102 also extends laterally to engage sidewalls (not shown) of the filter housing 101. Thus the filter assembly here is part of an air conditioning unit.

The filter housing 101 also defines first and second air inlets 103, 104 and an air outlet 109. In use, the first air inlet 103 which is generally upwardly open receives air from outside a vehicle in which the air conditioning unit is mounted and the second air inlet 104 connects to the interior of the passenger compartment of the vehicle. To select the mode of operation of the air conditioning unit, namely whether air is to be induced from outside or to be re-circulated from within the passenger compartment there is provided a mode door 105 pivoted on one side and capable of moving between the first position shown in FIG. 1 where it sealingly closes the second air inlet 104 and a second position shown in dotted lines as 106 where it sealingly closes the first air inlet 103.

The air outlet 109, as known to those skilled in the art, is connected to a fan incorporated within a heater and distribution unit, not shown.

On the upstream side of the evaporator 102 there is disposed an air filter 107 which removes particulate matter from air entering the air conditioning unit. Downstream of the evaporator 102 the lower wall 121 of the evaporator housing 101 is depressed downwardly to form a trough portion 110 having a fluid outlet 108.

In normal use, the above discussed fan is operated to cause air to enter via a selected one of the two air inlets 103, 104 and the air passes through the filter 107 and then through the evaporator 102. A refrigerant is supplied to evaporator 102 to cause the air passing through it to be cooled and, as known to those skilled in the art the cooling results in moisture in the air condensing out. The condensate is collected in the trough 110 and passes out of the air conditioning unit through the liquid outlet 108. The cooled air passes out of the outlet 109 for distribution to the passenger compartment of the vehicle.

A problem may arise in conditions of high rainfall or where the vehicle of concern passes through water. In this case, unless special measures are taken to prevent water ingress to the first air inlet 103, such water may enter through the first air inlet 103. Further reference to FIG. 1 shows that the filter 107 does not extend across the full height of the evaporator housing 101 but instead has a lower wall 111 which is spaced from the lower wall 121 of evaporator housing 101 so as to provide a passageway allowing any liquid to pass beneath the air filter. Such water can pass through the evaporator into the trough 110 and out through the liquid outlet 108. To provide adequate drainage the outlet in the embodiment allows around 8 L/minute to pass through at Failure to provide such a passage can result in the water level upstream of the filter rising sufficiently to flow out through the second air inlet 104 when the mode door 105 is switched over. Alternatively the water may stagnate causing smells in the system.

It will be seen from FIG. 1 that the filter 107 is suspended from the top wall 120 of the evaporator housing 101.

Figure 2:
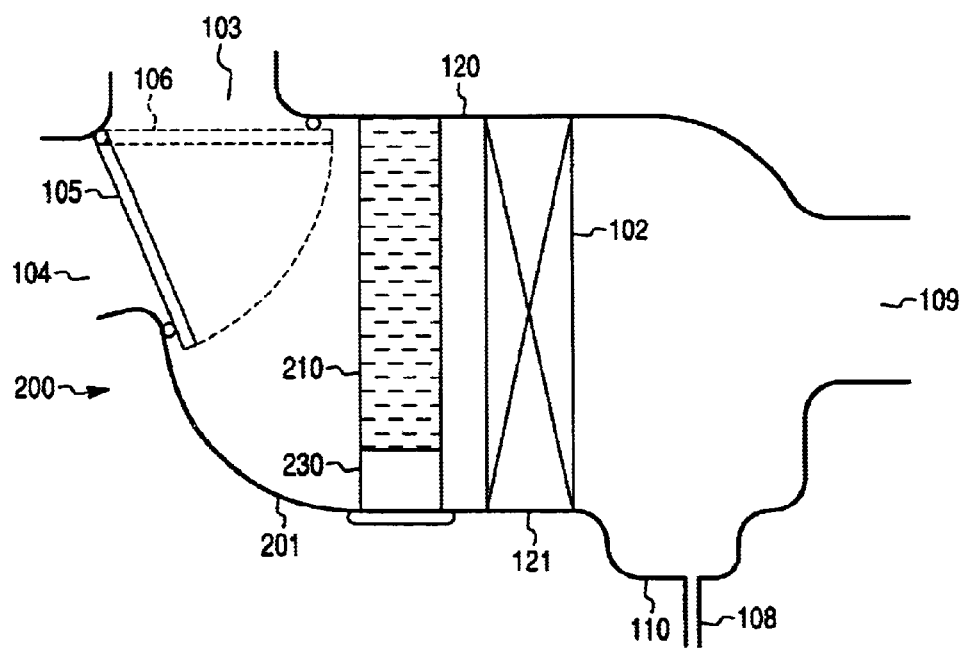
FIG. 2 shows a cross-sectional view through a second embodiment of an air filter assembly in accordance with the invention.

Referring now to FIG. 2, a second embodiment 200 is shown. This second embodiment has a filter module 210 which is inserted through an opening in the lower wall 121. The filter module is more clearly seen in FIG. 3.

Referring now to FIG. 3, filter module 210 consists of a frame having an outer perimeter portion 220 which extends from a face plate portion 221 to define a first generally rectangular opening 222 which supports a filter member 223. The filter member in this embodiment is netted polypropylene. The frame together with the face plate further comprises a transverse web portion 224 generally parallel to the face plate and spaced from it to define a passageway 230 between the face plate 221 and the web portion 224. Further reference to FIG. 3 shows that three supporting web portions 231 extend from the face plate 221 to the web portion 224 to provide four through holes following the passage 230.

On one side of the perimeter portion 220 there is a lipped flange portion 226 which engages with a corresponding slot in the evaporator housing 200. The slot runs along the sidewalls of the housing 200 and also along the top wall 120. Clips are used to secure the filter module 210 in sealing engagement with the lower wall 121 of the evaporator housing 201. Alternatively, screws or any other suitable fixing could be used.

It will be appreciated by those skilled in the art that the relative dimension of the passage 230 to the area of the filter part is important. In exactly the same way, the dimension of the spacing between the lower wall 111 to the lower wall 121 in relation to the size of the filter in the embodiment of FIG. 1 is important. If the area of the passageway is too great then air will be drawn through the passageway rather than passing through the filter. It is clearly desirable that air is predominantly drawn through the filter. To achieve this it has been found that a ratio of 1:32 is desirable.

It will understood by those skilled in the art that the trough portion 110 of the air conditioning unit represents an increased surface area which by virtue of being cold may allow condensation to form on the outside especially under humid conditions eg tropical conditions. To avoid this, the trough may be filled with an insulating material, preferably a closed cell foam which will not itself absorb liquid. Materials that absorb liquid may themselves give rise to smells in the system.

A second embodiment 310 of the air filter module will now be described with reference to FIG. 4.

A comparison between FIG. 4 and FIG. 3 shows that the second air filter module 310 is similar to the first module 210 with the exception of the opposing sidewalls of the outer perimeter portion of the frame. In the second filter module the sidewalls are formed to generally follow the zig-zag contours of the filter member 223 so that the sidewall consists of a series of V-shaped lands 311 with intercalated V-shaped cut-out portions 312.

The effect of the cut-out portions is to provide flexibility to the filter member whilst still providing structural integrity. Thus, a force applied to the face plate 221 either to insert or retract the filter module will be transferred to the whole filter module.

The perimeter portions of the frame are made from a plastics material, typically polypropylene, and the cut out portions 312 allow the filter module to be more easily inserted in a restricted access situation. Specifically, the face plate may be rotated about a transverse axis so that the filter module during insertion or extraction assumes a generally L shape.

The supporting web portions 231 extending from the sidewalls of the outer perimeter portion of the frame and the transverse web portion 224 create a stiff extension of the filter member. When removing a filter from its housing, the maximum constraints are faced during the initial part of the extraction. This is due to maximum lateral friction constraints and means that the highest effort is needed at this time. As is clear to those skilled in the art, after the range which requires the maximum effort, the frictional values drop rapidly and extraction movement speeds up. If the filter member is directly secured to the face plate, the movement of extracting the filter from the housing and at the same time rotating it causes a serious risk of damage. By provision of the supporting web portions 231 which creates a stiff extension the first part of extraction must be performed in line with the support slots in the housing and this prevents filter damage.

What is claimed is:

1. An air filter assembly for a motor vehicle comprising a filter housing and an air filter, the filter housing having an air inlet and an air outlet, the air filter being disposed in said filter housing, and the housing having at least one liquid outlet downstream of the filter wherein the assembly has a filter bypass passageway for enabling liquid entering at said air inlet to flow past said filter to said liquid outlet, wherein said filter bypass passageway is integrally formed with said air filter.

2. An air filter assembly as claimed in claim 1 further comprising an evaporator disposed downstream of the filter.

3. An air filter assembly as claimed in claim 1, wherein the housing has a lower wall and the air filter has a lower portion spaced from the lower wall to define said passageway therebetween.

4. An air filter assembly as claimed in claim 1, wherein the air filter has a total area more than 10 times the area of said passage.

5. An air filter assembly as claimed in claim 1 having an upper wall, opposing sidewalls and a lower wall, said lower wall defining an opening therein, a filter module having a portion extending through said opening, the filter module further having a face plate sealingly abutting an outer face of said lower wall, said filter module comprising a frame having an outer perimeter portion engaging the sidewalls and said upper wall, said frame supporting a filter member spaced from said lower wall to define said passage.

6. An air filter assembly as claimed in claim 5, wherein said frame comprises a transverse web spaced from the face plate and defining therebetween a through hole.

7. An air filter assembly as claimed in claim 6, further comprising plural supporting web portions disposed between the face plate and said transverse web.

8. An air filter assembly as claimed in claim 7, wherein said outer perimeter portion comprises opposing wall portions engaging said sidewalls, and an end wall portion abutting said upper wall, said opposing wall portions having first substantially rigid portions disposed between the face plate and the transverse web, and second flexible portions disposed between said transverse web and said end wall portion.

9. An air filter assembly as claimed in claim 8, wherein said flexible portions comprise a linear series of V-shaped cut-out portions.

10. An air filter assembly as claimed in claim 9, wherein the filter member has a total area more than 30 times the area of said passage.

11. An air filter assembly as claimed in claim 10, wherein the outer perimeter portion has an outwardly-directed flange portion and the housing has a counterpart slot.

12. An air filter assembly as claimed in claim 11, wherein the lower wall has a depressed region forming a trough.

13. An air filter assembly as claimed in claim 12, wherein said trough is substantially filled with a closed foam material.

14. An air filter assembly as claimed in claim 13, wherein said closed foam material comprises liquid guide passageways for directing the liquid to said liquid outlet.

* * * * *